July 21, 1925.

F. W. HIGGINS 1,546,382

SUPPORT FOR CERAMIC WARE

Filed April 28, 1922   2 Sheets-Sheet 1

INVENTOR
Francis W. Higgins,
By Byrnes, Stebbins, Parker & Parmelee
his ATTORNEYS July 21, 1925.
F. W. HIGGINS
1,546,382
SUPPORT FOR CERAMIC WARE
Filed April 28, 1922   2 Sheets-Sheet 2
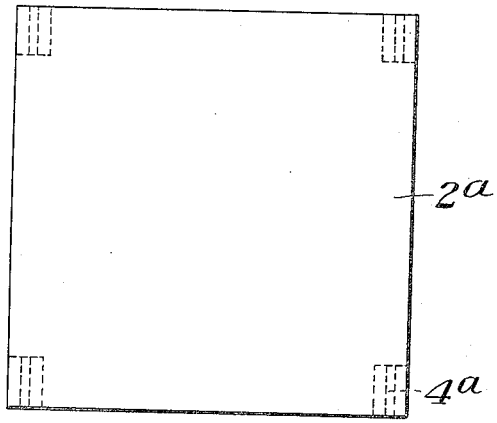
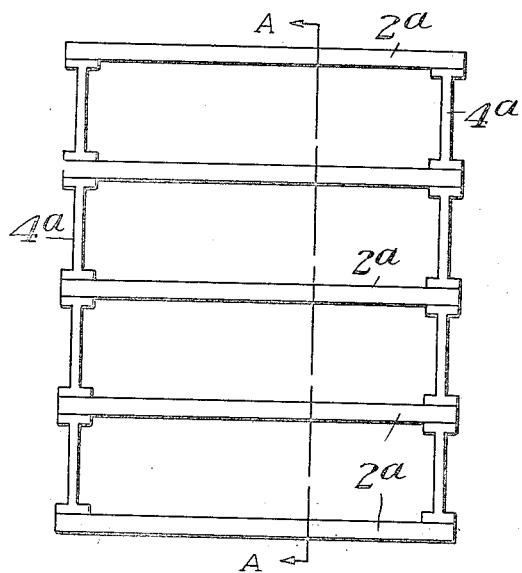
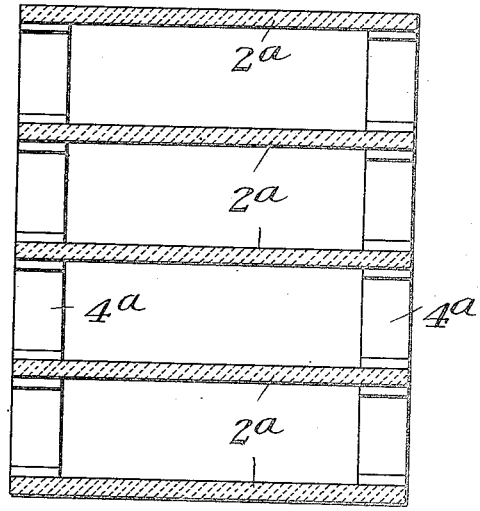
INVENTOR
Francis W. Higgins
Byrnes, Stebbins, Burgess & Parmelee
his ATTORNEYS Patented July 21, 1925.

1,546,382

UNITED STATES PATENT OFFICE.

FRANCIS W. HIGGINS, OF MANCHESTER, ENGLAND, ASSIGNOR TO THE CARBORUNDUM COMPANY, OF NIAGARA FALLS, NEW YORK, A CORPORATION OF PENNSYLVANIA.

SUPPORT FOR CERAMIC WARE.

Application filed April 28, 1922. Serial No. 557,214.

*To all whom it may concern:*

Be it known that I, FRANCIS W. HIGGINS, residing at Trafford Park, Manchester, England, have invented a new and useful Improvement in Supports for Ceramic Ware, of which the following is a full, clear, and exact description, reference being had to the accompanying drawings, forming part of this specification.

My invention relates to the burning of ceramic ware in kilns and particularly to the refractory supports which carry the ware during the burning or firing.

The object of the invention is to provide improved supports which will have much greater strength at the firing temperatures than the clay supports now used, and will also transmit the heat more efficiently than the ordinary supports.

My invention is an improvement upon the supports disclosed and claimed in the copending application of Frank J. Tone, Serial No. 534,464, filed February 6, 1922 which has resulted in Patent 1,488,011.

As stated in that application, silicon carbide when made into refractory forms by well known processes has remarkable mechanical strength not only at normal room temperatures, but at the higher ranges of temperature reached in ceramic kilns, which usually approximate 1350° C. For example, at this temperature, the modulus of rupture of such material is approximately 2200 pounds per square inch, whereas at that temperature the modulus of rupture of fireclay is only about 115 pounds per square inch. Hence, at ordinary kiln temperatures, silicon carbide refractory forms have about nineteen times the cross breaking strength of a fireclay refractory. For this reason, silicon carbide refractory forms can be applied in many locations with great advantage, particularly where vertical loads are to be taken care of.

Another advantage which silicon carbide has in this art is its well known thermal conductivity, which is about five times that of fireclay. Hence, when the refractory supports for ceramic ware are formed of bonded silicon carbide, the heat which strikes the outside of the pile is more quickly transmitted or conducted into the interior of the pile, giving a more uniform application of temperature with pieces being fired.

In the drawings:

Figure 3 is a view similar to Figure 1, showing another form of the invention;

Figure 4 is a side elevation of a pile of the supports of Figure 3; and

Figure 5 is a cross section on the line A—A of Figure 4, looking toward the left.

Figure 1:
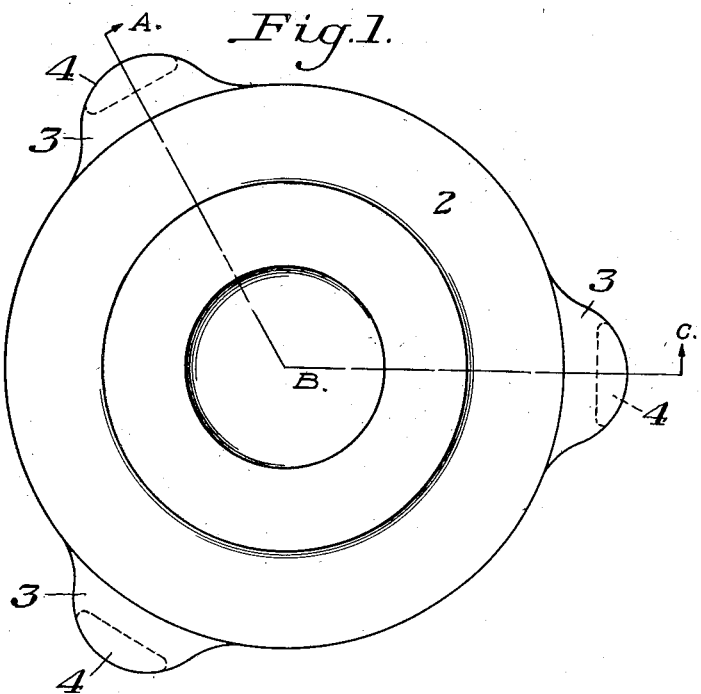
Figure 1 is a top plan view showing one form of my improved silicon refractory supports.
Figure 2:
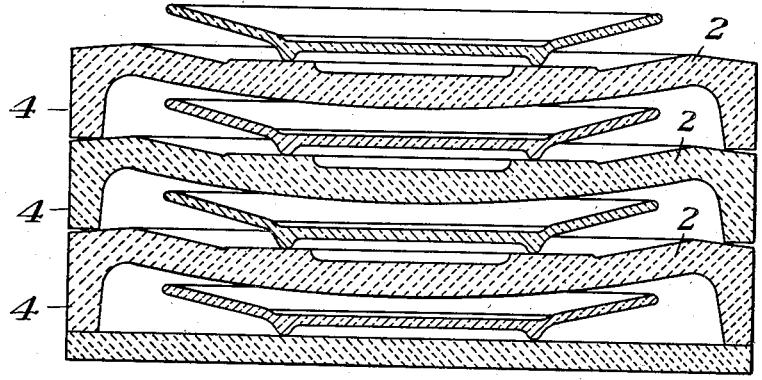
Figure 2 is an irregular section on the line ABC of Figure 1, showing a pile of the supports, each carrying one plate for firing.

Referring to the form of Figures 1 and 2, I show supports 2, composed of bonded silicon carbide, each having a central downwardly dished portion, shown as solid and conforming approximately to the shape and size of the plate, the outer portions having projections 3, provided with depending legs 4. These legs extend down to rest on the peripheries or legs of the next support. The supports are piled one above the other, each carrying one plate. These nest closely together, thus giving economy of kiln space, and on account of the great cross breaking strength of silicon carbide, the supports can be made thin and still support the load under the heat of firing without breaking or warping. The heat which strikes the outside of the pile is transmitted more quickly to the interior of the pile than with setters made of clay, and the heat so transmitted is brought into direct contact with the center of the plate where it rests on the support.

In Figures 3, 4 and 5, I show another form of my invention which consists of a series of plates, piles or platforms 2ª, of silicon carbide, separated by corner spacers, struts or pillars 4ª. These struts are shown as of general I-beam form, and are preferably placed at the corners or around the peripheries of the plates. These spacers may be integral parts of the plate or may be separate pieces. Here again, I obtain the advantages of great strength or durability in the supporting plates and efficient and uniform transmission of heat from the outside of the pile inwardly to the ceramic ware supported by the plates. The supporting spacers are also preferably of silicon carbide, although within my broader claims, they may be made of other material.

The advantages of my invention will be obvious to those skilled in the art, since cheap, economical and highly efficient refractory support is provided which is of great strength under the high firing heats and is also an efficient heat transmitter.

Variations may be made in the form and arrangement of the supports, the manner of forming the pile, the shape, etc., without departing from my invention.

I claim:

1. A support for firing ceramic ware, consisting of a load-supporting plate or member combined with supporting legs or spacers, both the plate and legs being formed of a material having a higher modulus of rupture at 1350° C. than 300 pounds per square inch.

2. A support for firing ceramic ware, consisting of a load-supporting plate or member combined with supporting legs or spacers, both the plate and legs being formed of a bonded artificial abrasive material having high heat resistance and a modulus of rupture at 1350° C. greater than 300 pounds per square inch.

3. A support for firing ceramic ware, consisting of a load-supporting plate or member combined with supporting legs or spacers, both the plate and legs being formed of a mixture containing a substantial portion of silicon carbide.

4. A pile of ceramic ware supports, comprising plates or platforms having spacing struts between them, the plates and struts being composed of a material having a higher modulus of rupture at 1350° C. than 300 pounds per square inch.

5. A pile of ceramic ware supports, comprising supporting plates or platforms having spacing struts between them, the plates and struts being composed of bonded artificial abrasive material.

6. A pile of ceramic ware supports, comprising plates or platforms having spacing struts between them, the plates and struts containing a substantial proportion of silicon carbide.

7. A support for firing ceramic ware, consisting of a load-supporting plate or member with supporting legs or spacers, both the plate and legs being formed of a material having a thermal conductivity more than three times that of clay sagger material.

8. A support for firing ceramic ware, consisting of a load-supporting plate or member with supporting legs or spacers, both the plate and legs being formed of bonded artificial abrasive material having a thermal conductivity approximately five times as great as clay sagger material.

In testimony whereof I have hereunto set my hand.

FRANCIS W. HIGGINS.